United States Patent [19]
Selway

[11] 3,761,064
[45] Sept. 25, 1973

[54] GAS SCRUBBER

[75] Inventor: Jack J. Selway, Brielle, N.J.

[73] Assignee: Andco Incorporated, Buffalo, N.Y.

[22] Filed: Dec. 30, 1970

[21] Appl. No.: 102,817

[52] U.S. Cl.............. 261/53, 261/62, 261/109, 261/108, 261/112
[51] Int. Cl.............................................. B01f 3/04
[58] Field of Search............ 261/53, 62, 108–113, 261/DIG. 54

[56] References Cited
UNITED STATES PATENTS

| | | | |
|---|---|---|---|
| 1,182,544 | 5/1916 | Ferguson | 261/62 |
| 1,964,357 | 6/1934 | Ketterer | 261/DIG. 54 |
| 1,176,747 | 3/1916 | Ferguson | 261/114 VT |
| 3,592,452 | 7/1971 | Katyal | 261/113 |
| 2,629,654 | 2/1953 | Olney | 261/114 JP |

Primary Examiner—Tim R. Miles
Assistant Examiner—Steven H. Markowitz
Attorney—Christel and Bean

[57] ABSTRACT

Apparatus for removing particulate material from a gas stream traveling through a duct comprising a pair of members each provided with a corresponding plurality of passages and arranged to cooperatively define a corresponding plurality of venturi passages extending generally parallel to the direction of flow of the gas stream and spaced around the axis of the duct. The members are relatively movable for varying the size of the venturi throats and for completely closing the passages when desired. Liquid is supplied to the upstream member and the venturi inlets defined thereby are of a configuration effecting a substantially uniform distribution of the liquid to the passages.

15 Claims, 7 Drawing Figures

INVENTOR.
Jack J. Selway
BY
Christel & Bean
ATTORNEYS.

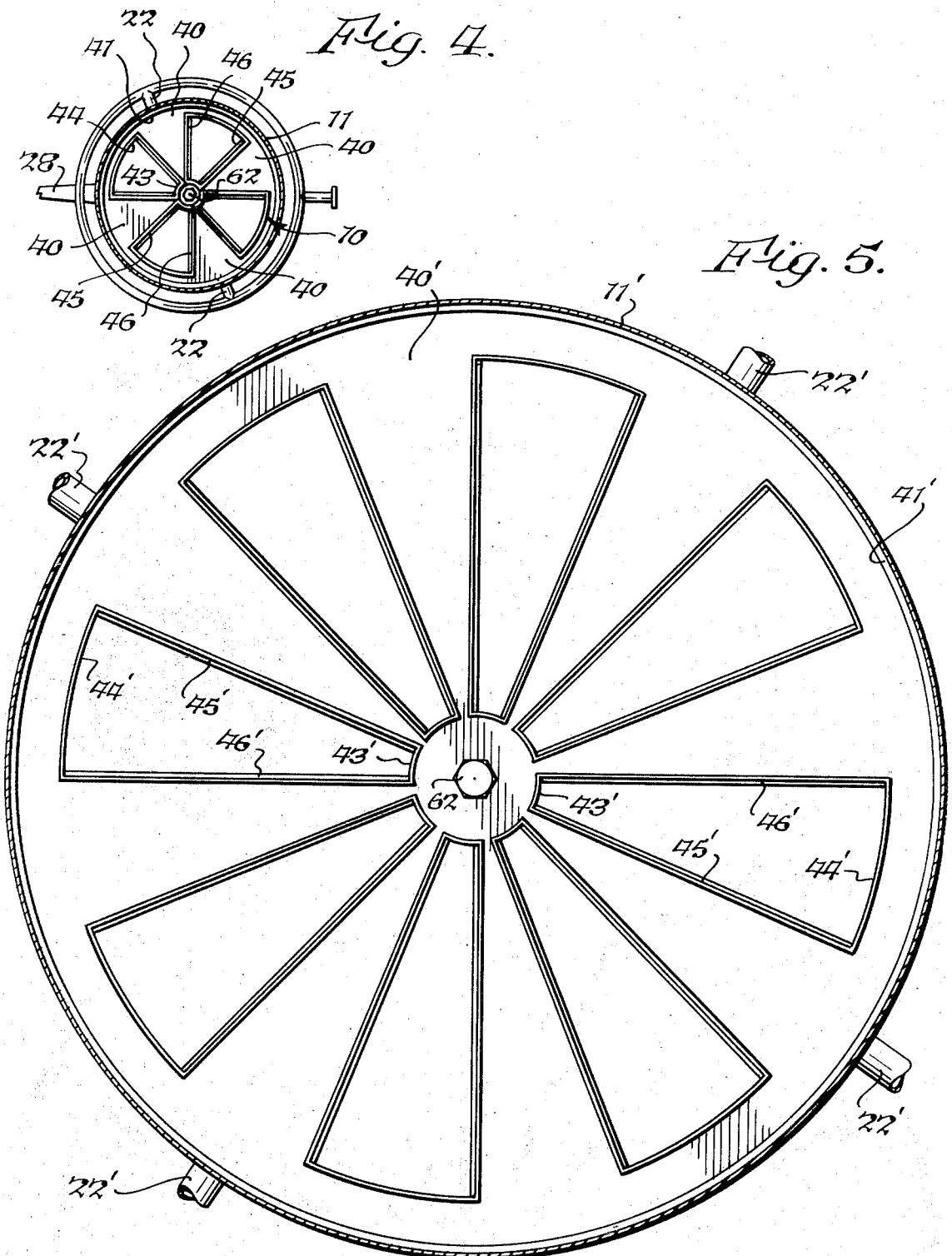

3,761,064

GAS SCRUBBER

BACKGROUND OF THE INVENTION

This invention relates to the gas scrubber art and, more particularly, to a new and useful wet collector advantageously including various desirable attributes of both the orifices and venturi types.

Wet collectors of the orifice type are well known, and offer the advantages of relative simplicity and low cost. However, these capabilities are limited, making them unsuitable for many installations. Wet collectors of the venturi type are capable of higher collection efficiencies, the collection efficiency increasing with higher pressure drops, and some venturi type collectors are designed with adjustable throats to allow a range of pressure drops for a given gas volume.

In order to achieve effective agglomeration in wet collection, it is necessary to reduce the size of the liquid drops formed to that of the particulate material. Thus, for a given size of particles to be removed from a gas stream, the pressure drop first must be increased to the necessary value and then that pressure drop must be maintained despite varying flow conditions. This has been achieved by the provision of movable dampers in conventional venturi type scrubbers, but only with the expenditure of considerable energy. Also, such venturi scrubbers are relatively large and expensive.

At intervals during the operation of wet collectors it is desired to effect a seal to permit purging or isolation of the system. This often is accomplished by providing a separate water seal, but methods and arrangements heretofore available are relatively complicated and require considerable effort on the part of the operator.

SUMMARY OF THE INVENTION

It is therefore an object of this invention to provide a new and improved wet collector advantageously combining various desirable features of the orifice and venturi types. Specifically, it is an object of this invention to equal, if not exceed, the capabilities of a venturi scrubber in an apparatus characterized by the relative simplicity and low cost of an orifice scrubber.

It is a more particular object of this invention to provide a gas scrubber of the web collector type wherein the pressure drop can be varied to provide effective agglomeration for various particle sizes and wherein a particular pressure drop can be maintained despite varying flow conditions, all with a relatively minimal expenditure of energy.

It is a further object of this invention to provide such a wet collector wherein the pressure drop can be varied over a significantly large range and can accommodate a wide range of gas flow conditions.

It is a further object of this invention to provide such a wet collector which is relatively small, simple in construction and operation, and relatively inexpensive.

It is a further object of this invention to provide such a wet collector capable of effecting a water seal when needed and in a relatively simple manner.

The present invention provides apparatus for removing particulate material utilizing first and second, relatively movable members having corresponding passages which cooperatively define venturi passages in a manner permitting variation in the size of the venturi throats with a relatively small expenditure of energy. Liquid is supplied at the periphery of a surface of one of the members and rises to the level of the venturi passage inlet openings, the inlet openings being of a shape creating a pressure differential which distributes the liquid uniformly into the openings.

The foregoing and additional advantages and characterizing features of the present invention will become clearly apparent from the ensuing detailed description together with the included drawings wherein:

BRIEF DESCRIPTION OF THE DRAWING FIGURES

FIG. 4 is a cross sectional view taken about on line 4—4 of FIG. 1;

FIG. 5 is a cross sectional view similar to that of FIG. 4 illustrating a modification of the apparatus;

DETAILED DESCRIPTION OF THE ILLUSTRATED EMBODIMENTS

Figure 1:
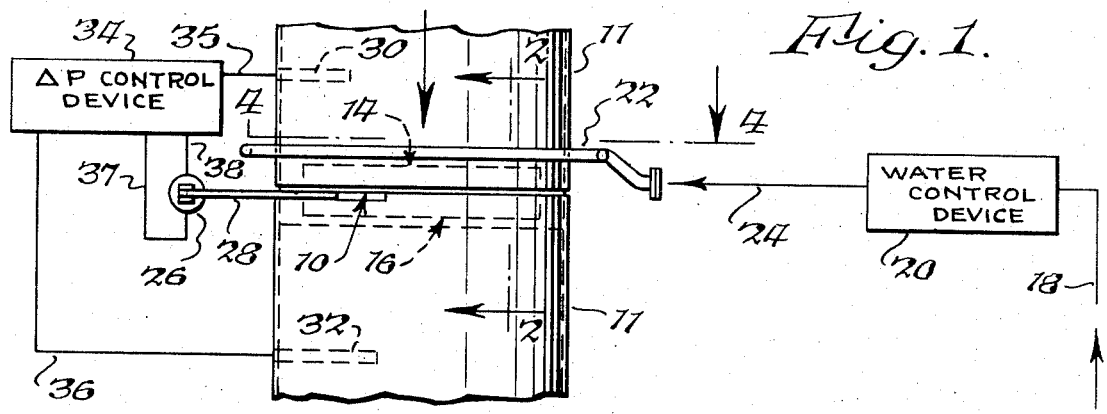
FIG. 1 is a fragmentary elevational view, partly schematic, showing the apparatus of the present invention as it would appear in use.

FIG. 1 illustrates apparatus 10 of the present invention arranged to remove particulate material from a gas stream traveling through a duct 11. The direction of flow of the gas stream is indicated by the arrow 12. The dirty gas can be the effluent from a blast furnace, in which case the upstream end of duct 11 is suitably connected to the furnace exhaust, but it will be appreciated that apparatus of the present invention has the capability of scrubbing gas obtained from any of a wide variety of sources.

In the illustrated embodiment apparatus 10 comprises a first member 14 and a second member 16 defining a plurality of venturi passages spaced around the axis of duct 11 and disposed generally parallel to the direction of flow of the gas stream as will be described in detail. The apparatus 10 further comprises means for supplying liquid to the inlets of the passages, in particular to member 14 in the form of a supply conduit indicated schematically at 18 connected to a suitable liquid source (not shown), a water control device 20, and a liquid distributing conduit 22 in communication with member 14 and connected through a conduit 24 to control device 20. In a presently preferred form, member 14 includes a generally horizontal planar surface, and liquid is supplied to that surface at or near the periphery thereof by conduit 22 whereupon the liquid level rises to the passage inlets.

The apparatus 10 further comprises means operatively connected to at least one of the first and second members 14 and 16, respectively, for causing relative movements of members 14, 16 in generally parallel planes whereby the throats of the venturi passages defined thereby can be varied in cross sectional area. The means for causing relative movement can comprise an hydraulic cylinder 26 suitably mounted or attached to a fixed reference surface relative to duct 11 and apparatus 10. The rod of cylinder 26 is connected to one end of an actuator arm or lever 28, the other end of which is attached or joined to member 16. The operation of cylinder is controlled as a function of the pressure drop across the apparatus 10 in duct 11 as determined by a first pressure sensing means 30 positioned in duct 11 upstream of apparatus 10 and a second pressure sensing means 32 positioned in duct 11 downstream of apparatus 10. A pressure sensitive control device indicated schematically at 34 in FIG. 1 is connected through a line 35 to sensor 30 and through a line 36 to sensor 32. Device 34, in turn, controls the flow of operating fluid to and from the rod and piston ends of cylinder 26 through lines 37 and 38. The detailed construction of device 34 and of sensing means 30, 32 per se comprise no part of the present invention, and since they are readily commercially available in various suitable forms, all readily understood by those skilled in the art, a detailed description thereof is unnecessary.

Figure 2:
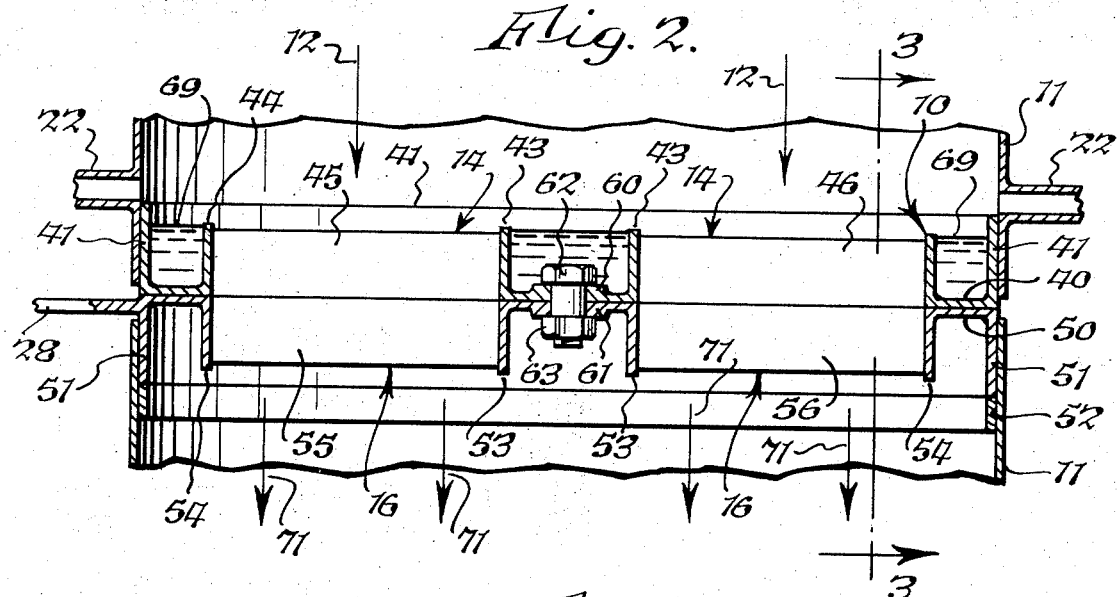
FIG. 2 is a vertical sectional view taken about on line 2—2 of FIG. 1.
Figure 3:
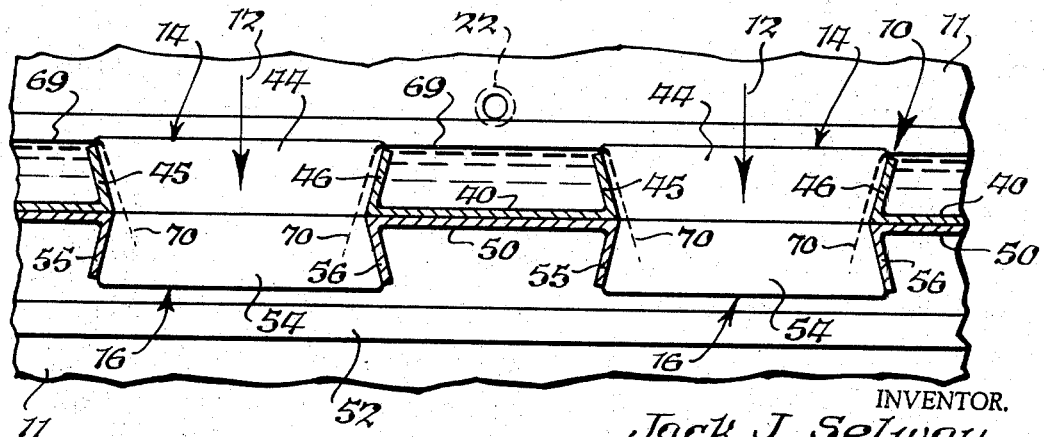
FIG. 3 is a developed section taken about on line 3—3 of FIG. 2.

Referring now to FIGS. 2–4, member 14 is formed to include the generally planar surface 40 and a peripheral edge portion in the form of a skirt-like rim 41 disposed at about a right angle to the plane of surface 40. When member 14 is in the operative position shown in FIG. 1, surface 40 is disposed generally horizontally and rim 41 projects upwardly in an upstream direction therefrom. In addition, rim 41 is of an outer dimension and shape so as to provide a snug-fitting relationship or engagement with the inner surface of duct 11. Member 14 is provided with a plurality of passages spaced around the center thereof and extending through surface 40, which center coincides with the axis of duct 11. In particular, each of the passages is defined in part by inner and outer end walls 43 and 44, respectively, which are radially spaced apart relative to the center of member 14. Each outer end wall 44 is greater in length than the corresponding inner end wall 43, for a purpose to be described. In addition, end walls 43, 44 preferably are arcuate, each being formed on a radius from the center of member 14, and end walls 43 and 44 are joined at corresponding opposite ends by relatively straight and generally radially extending side walls 45 and 46. When member 14 is located in duct 11 in the operative position of FIG. 1, each passage has an inlet opening defined by the edges of end walls 43, 44 and side walls 45, 46 which inlet opening is in communication with the dirty gas stream. Each of the passages, furthermore, is made to converge in the direction of the gas stream or, in other words, in a direction from the inlet opening toward surface 40. This is accomplished in the present illustration by having sidewalls 45, 46 disposed at a relatively small acute angle with respect to the direction of gas flow indicated by arrow 12. In other words, sidewalls 45, 46 are disposed each in a plane which extends at a relatively small acute angle to a line perpendicular or normal to surface 40, the angle preferably being about 15°. Walls 43–46 thereby define converging inlet passage portions. In the present illustration end walls 43, 44 are disposed at a right angle with repect to the plane of surface 40.

Member 16 preferably is indentical to member 14, and is provided with a corresponding plurality of passages located and disposed so as to be in communication with or mate with the passages in member 14 when the two members are assembled as shown and are in open position. However, member 16 is inverted relative to member 14, whereby the passage defining walls in member 16 diverge in a direction away from member 14. As a result, members 14 and 16 cooperate to define a plurality of venturi passages spaced around the axis of duct 11 and each extending generally in the direction of flow of the gas stream. Referring to FIGS. 2 and 3, member 16 as formed to include a generally planar surface portion 50 and a peripheral edge portion in the form of a skirt-like rim 51 which is disposed at about a right angle with respect to the plane of surface 50. When member 16 is located in duct 11 in the operative position shown in FIG. 1, surface 50 is disposed generally horizontally, and placed in contact with the underside of surface 40 of member 14. Rim 51 like rim 41 of member 14 is of a dimension and configuration so as to engage the inner wall surface of duct 11. In addition, member 16 can be supported in duct 11 by a bearing band 52 suitably attached to or formed on the inner surface of duct 11 and positioned whereby the lower or depending edge of rim 51 is seated thereon. Member 16, like member 14 and duct 11, is circular and is provided with a corresponding plurality of passages spaced around the center thereof and extending through surface 50, which center coincides with the axis of duct 11. As with member 14, each passage is defined by spaced-apart inner and outer end walls 53 and 54, respectively, and the outer end walls 54 are greater in length than the corresponding inner end walls 53. In addition, end walls 53 and 54 are generally arcuate, each being formed on a radius from the center of member 16, and each pair of end walls 53, 54 is joined by spaced-apart sidewalls 55, 56 extending generally radially outwardly relative to the center of member 16 and joining corresponding opposite ends of the end walls 53 and 54. Sidewalls 55, 56 diverge outwardly, that is each is disposed at a relatively small acute angle with respect to a line perpendicular to surface 50. According to the present illustration in this acute angle is about 15°. Walls 53–56 thereby define diverging outlet passage portions.

Accordingly, when members 14 and 15 are placed in the operative position such as shown in FIGS. 2 and 3, a plurality of venturi passages are defined with the passages being spaced, preferably equally, around the axis of duct 11. In the embodiment of FIG. 4 there are four venturi passages, but the number of passages will vary with the size of the duct. Members 14 and 16 being identical, the passages defined in member 14 each have a perimeter adjacent surface 40 which is identical with the perimeter of the corresponding passages in member 16 adjacent surface 50, and this perimeter defines the venturi throat in full open position. According to the present illustration, end walls 43, 44 of member 14 and end walls 53, 54 of member 11 all are disposed generally parallel to the direction of gas flow thereby cooperatively defining relatively straight venturi passage walls. Sidewalls 45, 46 of member 14 converge in the direction of gas flow indicated by arrow 12 and sidewalls 55, 56 diverge in the direction of flow thereby defining venturi passages each with a restricted throat at the juncture of members 14 and 16.

One illustrative arrangement for positioning members 14 and 16 in duct 11 is shown most clearly in FIG. 2. Member 16 is disposed so that planar portion 50 is generally horizontal and rim or flange 51 contacts the inner surface of duct 11 and the depending edge or rim 51 rests on bearing band 52 whereby member 16 is supported. Member 14 is then placed on member 16 and supported thereby in a manner defining the venturi passages as described hereinabove. Members 14 and 16 are provided with central hub portions 60 and 61, respectively, and a bolt 62 is placed through the aligned apertures of hubs 60, 61 to which is threaded a nut 63 for rotatably connecting members 14 and 16. Rim 41 of member 14 should contact or engage the inner wall surface of duct 11 in a manner providing a fluid-tight seal, and in some instances it may be necessary or desirable to enhance the seal such as by a peripheral weld between flange 41 and duct 11. The foregoing arrangement for positioning members 14 and 16 in duct 11 is illustrative, and other arrangements can be used within the spirit and scope of this invention. In this connection, it should be noted that the relative movement of rotation between members 14 and 16 can be accomplished by having member 14 fixed and by moving member 16 relative thereto, by moving member 14 when it need not be sealed to the wall of duct 11 while holding member 16 stationary, or by relatively moving both members 14 and 16 simultaneously.

Conduit 22 can be in the form of a manifold encircling duct 11, with multiple delivery conduits equally spaced therearound, and it has been found that adequate distribution can be obtained with the number of delivery conduits equalling one-half the number of venturi passages.

The apparatus of the present invention operates in the following manner. Liquid, usually water, is delivered by conduits 22 to member 14 at the periphery thereof and onto horizontal planar surface 40. The liquid fills the trough or reservoir defined by rim or flange 41 and the various end walls 43, 44 and sidewalls 45, 46 defining the venturi passage portions in member 14. The level of the liquid rises until it reaches the height of sidewalls 45, 56 as indicated at 69 in FIG. 3 whereupon the liquid enters the inlet portions of the passages and flows generally in a direction indicated by the dashed lines 70. Sides 45, 46 are of a height slightly less than that of end walls 43, 44 and function as weirs over which the liquid flows. The liquid is atomized in the venturi passages, by the moving gas stream, in a manner familiar to those skilled in the art, and the liquid droplets agglomerate with the solid particles in the gas stream. The relatively clean gas together with the agglomerated liquid drops and particles leave the venturi passages generally in a direction indicated by arrows 71 in FIG. 2 for subsequent separation of the liquid and agglomerated particles. In particular, separation of the agglomerated liquid drops and particles from the gas stream can be accomplished by gravity, by effecting an abrupt change in the direction of flow, or by other methods and apparatus well known to those familiar with the art.

For efficient operation of apparatus 10, it is desirable that the liquid or water be introduced relatively uniformly or evenly to the inlet openings of the venturi passages. In particular, it is desirable that the liquid flow over sidewalls 45, 46 substantially uniformly along the entire length of these walls. Delivery of the liquid to the central portion of member 14 poses a problem. It is a feature of this invention that such distribution is accomplished by the creation of a pressure differential in a radial direction across each of the venturi passage inlet openings whereby the pressure at or near the center of member 14 is lower than the pressure at the periphery of member 14. This pressure differential is provided, in turn, by having each venturi passage inlet opening of a generally pie-shaped configuration as shown in FIG. 4. In other words, each of the passage inlet openings has spaced apart side edges extending generally radially outwardly relative to the center of member 14 which edges define an acute included angle. Therefore, the venturi passages are of progressively decreasing cross-sectional area, proceeding radially inwardly from the outer end walls 44, whereby the velocity of the gas passing through the passages increases progressively, again proceeding radially inwardly from end walls 44. This results in a pressure gradient of progressively decreasing, radially inward form across member 14, producing a pressure differential causing liquid to flow radially inwardly across surface 40 of member 14. In addition, it has been found that this configuration of the inlet openings according to the present invention adds more impetus to the fluid flow through the venturi throats.

To achieve the desired degree of agglomeration for optimum operation of appratus 10, it is necessary that the atomized liquid droplets be of a size substantially equal to that of the particles to be removed from the gas stream. The size of the liquid drops is, in turn, a function of the pressure drop across apparatus 10, i.e., between the upstream side of member 14 and the downstream side of member 16. Accordingly, for a given size of particle present in the gas stream, it ill be necessary to vary the pressure drop to form liquid drops of the required size. In addition, if a characteristic of the flow should happen to change, such as the volume, an adjustment most probably will be necessary to maintain the desired pressure drop.

Figure 6:
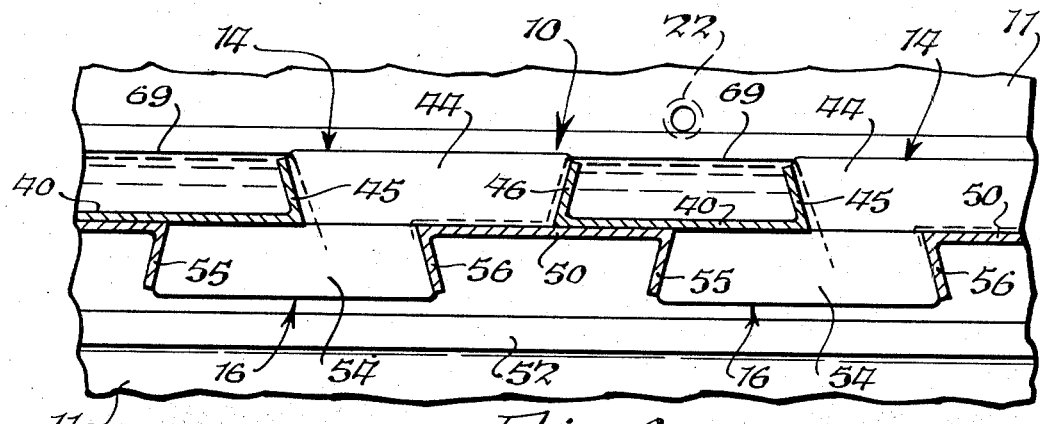
FIG. 6 is a developed section similar to that of FIG. 3 but showing the apparatus in a condition of full closure.

In the venturi type of wet collector, the venturi throat can be varied in size to provide the foregoing adjustment or compensation. In venturi wet collectors heretofore available, varying the throat size as by means of dampers has been accomplished only with a considerable expenditure of energy. According to the present invention, however, the throat of each of the venturi passages can be varied in size by a simple relative movement of members 14, 16, and this is accomplished with a relatively minimal energy expenditure arising from the action of essentially only shearing forces on members 14, 16. Referring now to FIGS. 1, 2 and 6, member 16 is moved, by rotation in a plane normal to the direction of gas flow to vary the throat size of the venturi passages cooperatively defined by members 14 and 16. For example, member 16 can be rotated relative to member 14 to a partially closed condition of the venturi passages as shown in FIG. 6, and as compared with the fully open position of FIG. 3. In the illustrated embodiment, movement of member 16 is effected by hydraulic cylinder 26, the movement of the cylinder rod being transmitted through arm 28 to rotate member 16. Movement of member 16 to vary the size of the venturi throats is performed as a function of a pressure difference, under control of device 34 connected to cylinder 26 and to the pressure sensing means 30 and 32. Accordingly, member 16 is moved automatically to vary the throat size of the venturi passages as a function of the pressure drop existing between the region upstream of member 14 and the region downstream of member 16. Of course, the relative positioning of members 14 and 16, to selectively vary the throat size, can be accomplished manually.

Figure 7:
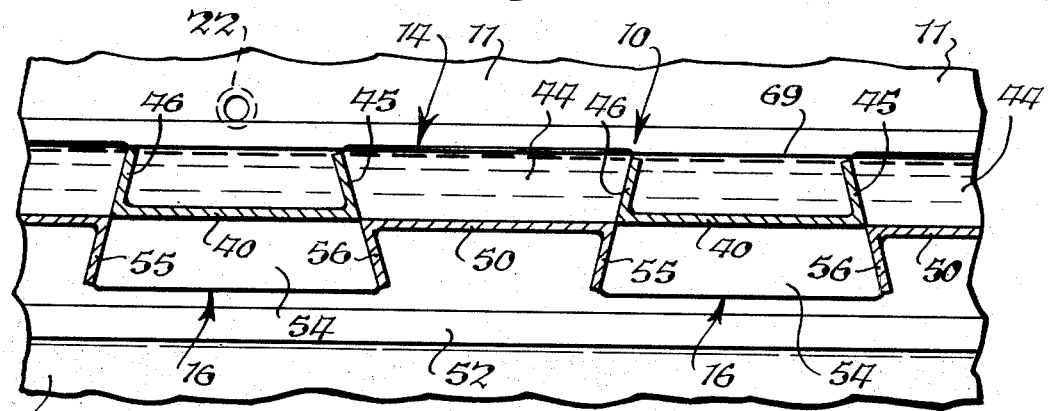
FIG. 7 is a developed section similar to that of FIG. 6 but showing the apparatus in a condition of full closure.

It is a standard practice to provide separate water seals for the purpose of isolating the system. However, the provision of a separate seal is unnecessary, and its function is accomplished by the apparatus of the present invention in a convenient, easy and economical manner. When a liquid or water seal is desired, member 16 is simply moved or rotated to the position of full closure indicated in FIG. 7. The supply of liquid to member 14 is continued, in a sufficient amount to effect a seal across the blocked throats of the passages notwithstanding spaces which may exist between members 14, 16 because of manufacturing tolerances. It should be noted that member 14 is in liquid tight engagement with the duct wall, as by a welded seam or other means.

Apparatus 10 of the present invention is suitable for use with ducts of various diameters and requires only slight modification for the same. FIG. 4 shows a member 14, identical in construction to its companion member 16, for use in a relatively small duct. For a duct of this relative size, four venturi passages are defined. For purposes of illustration, member 14 in FIG. 4 has an overall diameter of about 1 foot, sidewalls 45, 46 each have a length of about 4 inches, and the included angle therebetween is about 45°. Outer end walls 44 are spaced about 1 inch from rim 41, and inner end walls 43 are spaced about 0.8 inches from the center of member 14. FIG. 5 shows a modification of the apparatus for use in a duct 11' of a relatively larger diameter. For this relatively larger duct, eight venturi passages are defined. Identical components and members are given the same numbers as in FIGS. 1-4 with a prime superscript. For purposes of illustration, member 14' has an overall diameter of about 5 feet, 4 inches and sidewalls 45', 46' are of a length of about 32.5 inches with an included angle of about 22.5°. Inner end walls 43' are spaced about 4.5 inches from the center of member 14'. and outer end walls 44' are spaced a distance of about 4 inches from rim 41'. It has been found that increasing the overall diameter of members 14, 16 requires a larger number of passages each of a relatively smaller included angle.

It is therefore apparent that the present invention accomplishes its intended objects. The apparatus 10 of the present invention is of a relatively simple construction, easily assembled and operated and economical to manufacture particularly when members 14 and 16 are of identical construction. The apparatus has a high collection efficiency, approaching and sometimes exceeding that of a conventional venturi scrubber, while requiring a relatively minimal expenditure of energy for varying the throat size of the venturi passages and while requiring a relatively small space. Effective liquid distribution is obtained by a radial pressure differential across the upstream side of the scrubber. In addition, the apparatus permits a water seal to be provided in a convenient and easy manner for isolating the system in which it is included.

While specific embodiments of the present invention have been described in detail, this has been done by way of illustration without thought of limitation.

I claim:

1. Apparatus for removing particulate material from a gas stream traveling through a duct, said apparatus comprising:
   a. a first member positioned in said duct, said member having a surface on the upstream side thereof and provided with a plurality of passages, said passages having inlet openings in communication with said gas stream and said passages converging from said inlet openings in the direction of said gas stream;
   b. a second member positioned in said duct adjacent said first member on the downstream side thereof, said second member being provided with a corresponding plurality of passages located therein for communication with the passages in said first member, said second member passages diverging from said first member passages in the direction of said gas stream whereby a plurality of venturi passages are defined;
   c. means operatively connected to at least one of said first and second members for causing relative movement of said first and second members thereby to vary the throat size of said venturi passages; and
   d. means for delivering liquid onto said surface of said first member and therealong and into said inlet openings of said passages in said first member;
   e. whereby said liquid is atomized in said passages by the moving gas stream and the resulting liquid drops agglomerate with the particulate material in the gas stream.

2. Apparatus according to claim 1 wherein each of said first and second members comprises a generally planar portion through which said passages extend, a peripheral edge portion adjacent the wall of said duct and a plurality of walls extending from said planar portion and located within said peripheral edge portion for defining said passages.

3. Apparatus according to claim 2 wherein said duct is circular in cross section and wherein said peripheral edge portion of each of said first and second members comprises a rim for engaging the inner surface of said duct and wherein said passages are positioned circumferentially around the axis of said duct.

4. Apparatus according to claim 3 wherein said rim on said second member extends downstream from said planar portion thereof and abuts an annular shoulder extending from the inner surface of said duct so as to be rotatably supported thereon, and wherein said first member is supported by said second member, said first and second members being rotatably connected together at the centers along a common axis coincident with the axis of said duct.

5. Apparatus according to claim 2 wherein said walls are arranged in groups, there being one group on each member for each passage and including spaced apart end walls and spaced apart side walls joining corresponding opposite ends of said end walls, said side walls being disposed at relatively small acute angles relative to the gas stream.

6. Apparatus according to claim 2 wherein said members are identical in construction, and are relatively movable between a full open position and a full closed position.

7. Apparatus as set forth in claim 1,
   a. said first member including a generally planar portion, said passages thereof extending through said planar portion and each being defined by spaced apart end walls and spaced apart sidewalls joining said end walls, and at least two opposite ones of said walls defining each of said passages being disposed at a relatively acute angle with respect to a line normal to said planar portion whereby the cross sectional area of each of said passages is smallest adjacent said planar portion;

b. said second member also including a generally planar portion, said passages thereof extending through said planar portion and being defined by spaced apart end walls and spaced apart sidewalls joining said end walls, and at least two opposite ones of said walls defining each of said passages being disposed at a relatively acute angle with respect to a line normal to said planar portion whereby the cross sectional area of each of said passages is smallest adjacent said planar portion;

c. said passages in said first and second members having substantially identical perimeters adjacent the corresponding planar portions of said first and second members; and d. means mounting said first and second members in said duct in a manner such that the planar portions of said first and second members are disposed generally horizontally in generally parallel planes with corresponding ones of said passages in said first and second members cooperatively defining a corresponding plurality of venturi passages disposed in the direction of travel of said gas stream.

8. Apparatus according to claim 7 wherein the outer ones of said end walls are greater in length than the inner ones of said end walls in said first and second members and said sidewalls extend generally radially outwardly from the center of said planar portions of said first and second members whereby a pressure differential is created to distribute liquid in a direction along the entire length of each of said side walls as the liquid level rises to the height of said sidewalls.

9. Apparatus according to claim 1 further including:
a. first pressure sensing means positioned in said duct upstream from said first member relative to the direction of flow of said gas stream;
b. second pressure sensing means positioned in said duct downstream from said second member relative to the direction of flow of said gas stream; and
c. control means connected to said first and second sensing means and responsive to the pressure difference measured therebetween, said control means being connected in controlling relation to said means causing relative movement between said first and second members whereby the throats of said venturi passages are varied in response to changes in the pressure drop across said apparatus.

10. Apparatus for removing particulate material from a gas stream traveling through a duct, said apparatus comprising:
a. a first member positioned generally horizontally in said duct and comprising a generally planar portion provided with a plurality of passages which extend therethrough, a peripheral edge portion adjacent the wall of said duct and a plurality of walls extending from said planar portion and located within said peripheral edge portion for defining said passages, said passages having inlet openings in communication with said gas stream and converging from said inlet openings in the direction of said gas stream;
b. a second member positioned generally horizontally in said duct adjacent said first member on the downstream side thereof, said second member comprising a generally planar portion provided with a corresponding plurality of passages located therein for communication with the passages in said first member, a peripheral edge portion adjacent the wall of said duct and a plurality of walls extending from said planar portion and located within said peripheral edge portion for defining said passages, said second member passages diverging from said first member passages in the direction of said gas stream whereby a plurality of venturi passages are defined;
c. means operatively connected to at least one of said first and second members for causing relative movement of said first and second members thereby to vary the throat size of said venturi passages; and
d. means for delivering liquid to the inlet openings of said passages in said first member, said liquid delivering means comprising conduit means positioned to deliver liquid to said planar portion of said first member near said peripheral edge portion thereof whereby liquid rises to a level corresponding to the height of said side walls and then flows into said passages defined by said walls.

11. Apparatus according to claim 10 wherein said walls are arranged in groups, there being one group for each of said passages and the walls of each group being positioned relative to each other so as to define passage inlet openings having a configuration which gives rise to a pressure differential between the center of said planar portion and said peripheral edge portion of said first member for distributing liquid substantially uniformly to said passages.

12. Apparatus according to claim 11 wherein each of said passage inlet openings has spaced apart edges extending generally radially outwardly relative to the center of said planar portion which edges define an acute included angle.

13. Apparatus for removing particulate material from a gas stream traveling through a duct, said apparatus comprising:
a. a first member positioned in said duct and provided with a plurality of passages, said passages having inlet openings in communication with said gas stream and converging from said inlet openings in the direction of said gas stream, said first member including a generally planar portion, said passages thereof extending through said planar portion and each being defined by spaced apart end walls and spaced apart sidewalls joining said end walls, and at least two opposite ones of said walls defining each of said passages being disposed at a relatively acute angle with respect to a line normal to said planar portion whereby the cross sectional area of each of said passages is smallest adjacent said planar portion;
b. a second member positioned in said duct adjacent said first member on the downstream side thereof, said second member being provided with a corresponding plurality of passages located therein for communication with the passages in said first member, said second member passages diverging from said first member passages in the direction of said gas stream whereby a plurality of venturi passages are defined, said second member including a generally planar portion, said passages thereof extending through said planar portion and being defined by spaced apart end walls and spaced apart sidewalls joining said end walls, and at least two opposite ones of said walls defining each of said passages being disposed at relatively acute angles with respect to a line normal to said planar portion whereby the cross sectional area of each of said passages is smallest adjacent said planar portion;

c. said passages in said first and second members having substantially identical perimeters adjacent the corresponding planar portions of said first and second members;

d. means mounting said first and second members in said duct in a manner such that the planar portions of said first and second members are disposed generally horizontally in generally parallel planes with corresponding ones of said passages in said first and second members cooperatively defining a corresponding plurality of venturi passages disposed in the direction of gravel of said gas stream;

e. means operatively connected to at least one of said first and second members for causing relative movement of said first and second members thereby to vary the throat size of said venturi passages; and f. means for delivering liquid to the inlet openings of said passages in said first member, said liquid delivering means comprising conduit means positioned to deliver liquid to said planar portion of said first member near said peripheral edge portion whereby liquid rises to a level corresponding to the height of said sidewalls and then flows into said passages defined by said walls and wherein the inlet openings of said passages have a configuration which gives rise to a pressure differential between the center of said planar portion and said peripheral edge portion of said first member for distributing liquid along the entire length of each of said sidewalls.

14. Apparatus according to claim 13 wherein said sidewalls defining said passages extend generally radially outwardly relative to the center of said planar portion and define therebetween an acute included angle.

15. Apparatus for removing particulate material from a gas stream traveling through a duct, said apparatus comprising:

a. means in said duct defining a surface extending generally horizontally across said duct;

b. means defining a plurality of venturi passages extending through said horizontal surface generally in the direction of said gas stream and spaced around the axis of said duct, said passage defining means providing inlet openings spaced above the plane of said horizontal surface with each of said inlet openings having a transverse dimension which increases in a radially outwardly direction; and c. means for delivering liquid to said horizontal surface in a manner whereby the level of liquid rises to that of said inlet openings;

d. whereby a pressure differential is created across said surface to distribute liquid substantially evenly to said inlet openings along the radial dimension thereof.

* * * * *

UNITED STATES PATENT OFFICE
CERTIFICATE OF CORRECTION

Patent No. 3,761,064          Dated September 25, 1973

Inventor(s)  Jack J. Selway

It is certified that error appears in the above-identified patent and that said Letters Patent are hereby corrected as shown below:

In claim 13, column 11, line 16 "gravel" should be
--travel--

Signed and sealed this 2nd day of April 1974.

(SEAL)
Attest:

EDWARD M. FLETCHER, JR.                C. MARSHALL DANN
Attesting Officer                      Commissioner of Patents